United States Patent [19]
Burton et al.

[11] Patent Number: 5,442,632
[45] Date of Patent: Aug. 15, 1995

[54] STALE PACKET REMOVAL METHOD AND APPARATUS

[75] Inventors: Robert W. B. Burton; William A. Hammond, Jr.; John C. Willis, all of Rochester, Minn.

[73] Assignee: International Business Machines Corporation, Armonk, N.Y.

[21] Appl. No.: 215,917

[22] Filed: Mar. 22, 1994

[51] Int. Cl.[6] .......................................... H04L 12/46
[52] U.S. Cl. .................................................. 370/85.14
[58] Field of Search ............... 370/85.14, 85.13, 85.15, 370/60, 60.1, 94.1, 94.2, 94.3; 340/825.05, 825.06, 825.07, 825.52

[56] References Cited

U.S. PATENT DOCUMENTS

| | | | |
|---|---|---|---|
| 4,567,590 | 1/1986 | Bederman | 370/85.15 |
| 4,680,756 | 7/1987 | Sugimoto et al. | 370/85.14 |
| 4,918,687 | 4/1990 | Bustini et al. | 370/60.1 |
| 4,965,790 | 10/1990 | Nishino et al. | 370/85.12 |
| 5,216,670 | 6/1993 | Ofek et al. | 370/85.14 |
| 5,224,096 | 6/1993 | Onishi et al. | 370/85.14 |
| 5,251,213 | 10/1993 | Videlock et al. | 370/85.14 |

*Primary Examiner*—Wellington Chin
*Attorney, Agent, or Firm*—J. Michael Anglin; Joan Pennington

[57] ABSTRACT

A stale packet removal apparatus and method are provided for a digital processing system of the type having multiple devices that communicate via a plurality of unidirectional rings. Each requesting device sets a traversal count value in a packet and then sends the packet. When the packet is received at an agent, the agent changes the traversal count value and sends the packet onto another of the unidirectional rings. When a device receives the packet, the device identifies the traversal count value and discards the packet responsive to a predefined traversal count value.

13 Claims, 5 Drawing Sheets

STALE PACKET REMOVAL METHOD AND APPARATUS

BACKGROUND OF THE INVENTION

1. Field of the Invention

The invention relates generally to a digital processing system for devices that communicate via unidirectional rings, and more particularly to method and apparatus for removing stale packets from the system.

2. Description of the Prior Art

IEEE P1596 SCI (scalable coherent interface) Standards specifies protocols for devices that communicate via unidirectional rings. For each device connection, the ring is broken, and a device interposed such that the ring flows into the input port of the device and out again onto the ring. Encapsulated streams of information, known as packets, originate with a device known as the requesting device or requester, and travel across one or more rings to a device known as the responding device or responder, then return back along the same or alternate pathway.

A device may insert packets onto a ring to which it is connected, pass packets through from input to output, or extract packets from the ring. If a packet is extracted from the ring, a copy is not passed to the device's output or onto the ring. All devices within a system may be connected within a single ring, or one device may be connected into two or more rings by an agent function. Agents selectively move packets between rings in order to transport packets between devices on distinct rings.

Each connection point on a device to a ring, known as a port, has the capability to scrub packets. Exactly one scrubbing function is enabled per ring. Within each packet, there is a single bit field defined as the old bit. Each time a packet is inserted onto the ring, the old bit is cleared. When such a packet passes through the enabled scrubber, the scrubber examines the state of the old bit field. If the state is still clear, the old bit field is set. If the old bit field is already set on arrival, then the entire packet is extracted from the ring and discarded. This bounds the time a packet may continuously travel on one ring to a little less than two cycles.

The old bit limits continuous travel on a single ring, but does not bound the total time a packet may travel on two or more rings. IEEE P1596 SCI Standards specifies a time-of-removal (TOR), time-stamp field embedded within the packet, to denote when the packet should be extracted and discarded. The time of removal is set based on the time at which a packet originates at the requestor plus some time interval thought to allow any correct transport to occur. The time of removal is encoded using mantissa and exponent values.

While the old bit removes stale packets from a single ring in a simple fashion, the time-of-removal policy requires a global time from which to initially calculate the time of removal that is both difficult and expensive in terms of logic or cell count. Determining a time interval during which all correctly routed packets must be delivered is difficult and error prone. Decrementing and comparing a mantissa and exponent representation of the time of removal is much more difficult than comparable operations on an integer, especially if the time-of-removal encoding wraps around to zero.

Also, transmission of a packet across a ring may be retried if an echo of the sent packet is not received within a time-out period. The number of times such transmission occurs must be bounded to some integer number of retries. When this number of retries has been exceeded without receipt of an echo, higher level protocols depend on termination of retry events. Counting the number of attempts to insert a packet onto a ring requires a modest amount of dedicated logic.

A need exists for a stale packet removal method that eliminates the need for a single system-wide time reference as required for the SCI Standards time-of-removal mechanism. A need exists for a stale packet removal method that is simple to implement, efficient and reliable.

SUMMARY OF THE INVENTION

A principal object of the present invention is to provide a method and apparatus for removing stale packets. Other objects are to provide such method and apparatus substantially without negative effects and that overcome disadvantages of prior art arrangements.

In brief, the objects and advantages of the present invention are achieved by a stale packet removal apparatus and method for a digital processing system of the type having multiple devices that communicate via a plurality of unidirectional rings. Each requesting device sets a traversal count value in a packet and then sends the packet. When the packet is received at an agent, the agent changes the traversal count value and sends the packet onto another of the unidirectional rings. When a device receives the packet, the device identifies the traversal count value and discards the packet responsive to a predefined traversal count value.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
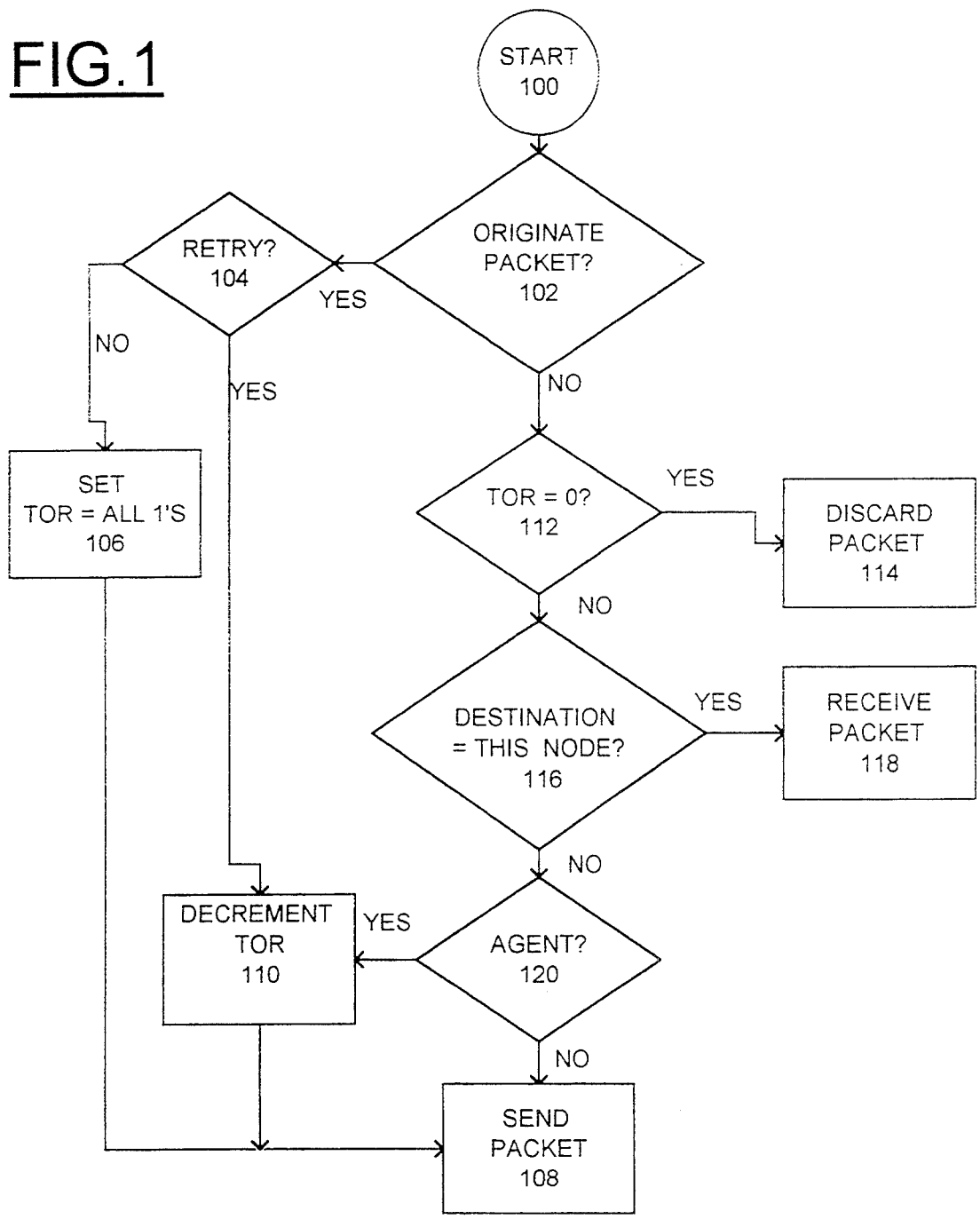
FIG. 1 is a flow chart showing sequential steps for stale packet removal in accordance with the invention.

In FIG. 1 there is shown a flow chart illustrating sequential operations for stale packet removal in accordance with the invention. The method of the invention for removing stale packets from a digital system having multiple ring buses for passing data packets among system devices utilizes a traversal count value in each data packet which is changed to a predetermined traversal count value before removing a stale packet. For example, as shown in FIG. 1, the traversal count value is decremented to zero before removing a stale packet. Alternatively, the traversal count value could be incremented until a predefined traversal count value is identified before removing a stale packet.

Sequential operations start at entry block 100 with an identification of an originate packet transaction as indicated at a decision block 102. When an originate packet transaction is identified at block 102, then it is determined whether this is a retry packet as indicated at a decision block 104. When the packet is not a retry packet, then the time-of-removal (TOR) traversal count value is set to all ones and the packet is sent as indicated at blocks 106 and 108. Otherwise, when a retry packet is identified at block 104, then the TOR traversal count value is decremented as indicated at a block 110. Then the packet is sent at block 108. By decrementing the traversal countdown field within the packet on each retry, the need for special hardware in the SCI device's output buffer to bound the number of retries is eliminated. The TOR traversal counterfield in the packet is outside the cyclic-redundancy code (CRC) to avoid corruption of the packet.

When an originate packet transaction is not identified at decision block 102, then it is determined if the packet's TOR traversal count value is zero as indicated at a decision block 112. When the TOR traversal count value is zero, then the packet is discarded as indicated at a block 114. Otherwise when the TOR traversal count value is not zero, then it is determined whether the device or node is the destination for the packet as indicated at a decision block 116. When the destination node is identified at block 116, then the packet is received as indicated at a block 118 and the packet is not passed on to another node. When the destination node is not identified at block 116, then it is determined whether the node is an agent for passing the packet to another unidirectional ring at a decision block 120. If so, the agent decrements the packet's TOR traversal count value at block 110 and the packet is sent at block 108. Otherwise, if the node is not an agent, then the packet is sent at block 108 without changing the packet's TOR traversal count value.

Figure 2:
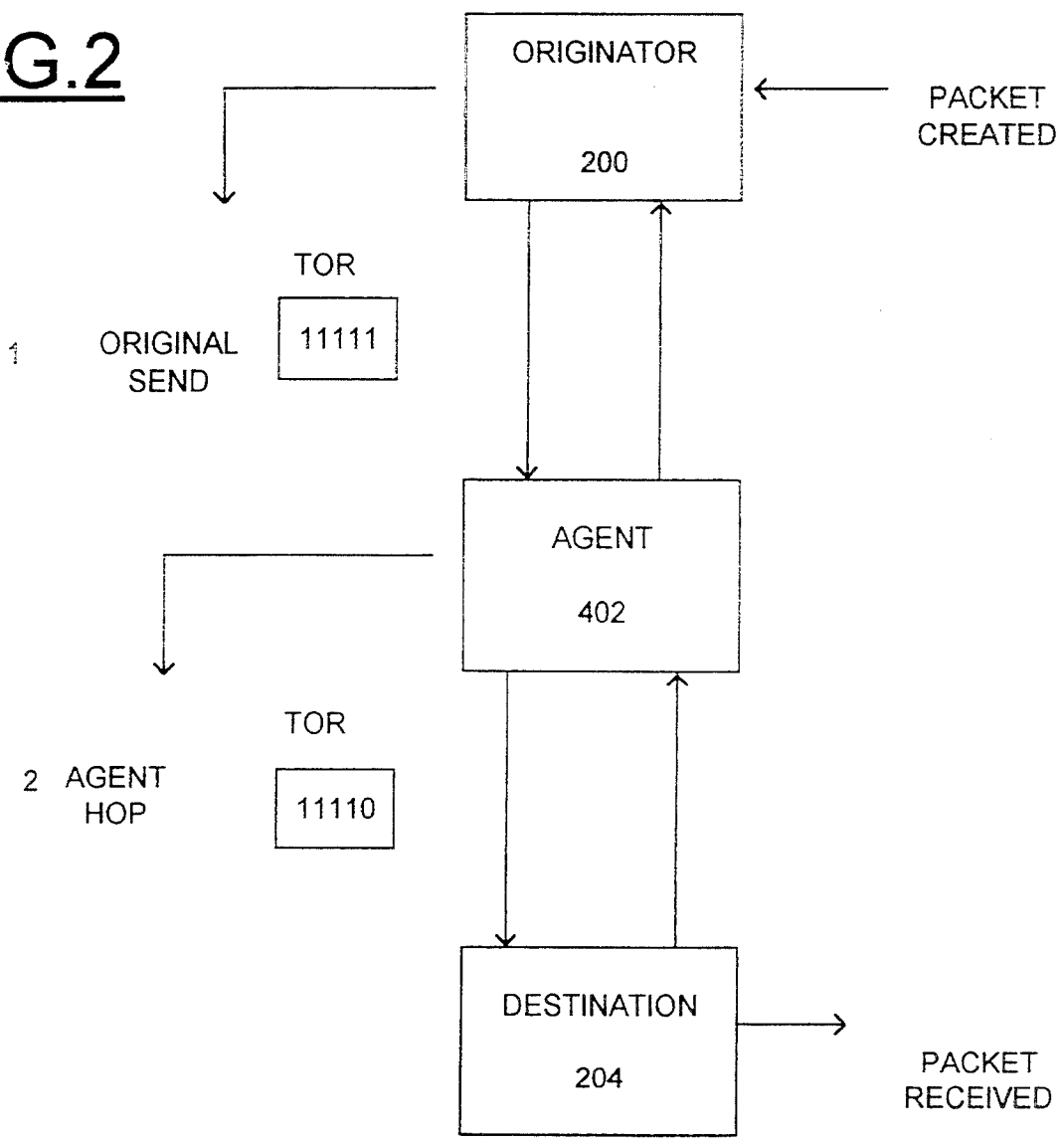
FIG. 2 is a block diagram representation of a communication system including an origination node and a destination node in a pair of unidirectional rings embodying the invention.

FIG. 2 is a block diagram of a communication system including an originator node 200 and a destination node 204 in a pair of unidirectional rings connected by an agent 202 illustrating sequential operations in accordance with the invention. A packet is created at the originator device 200. Then in step 1, the packet is sent with a TOR traversal count value set to all ones, for example, 11111 as shown. In step 2, the agent 202 decrements the TOR traversal count value to 11110 and sends the packet. The packet is received at the destination device 204 with the TOR traversal count value of 11110.

Figure 3:
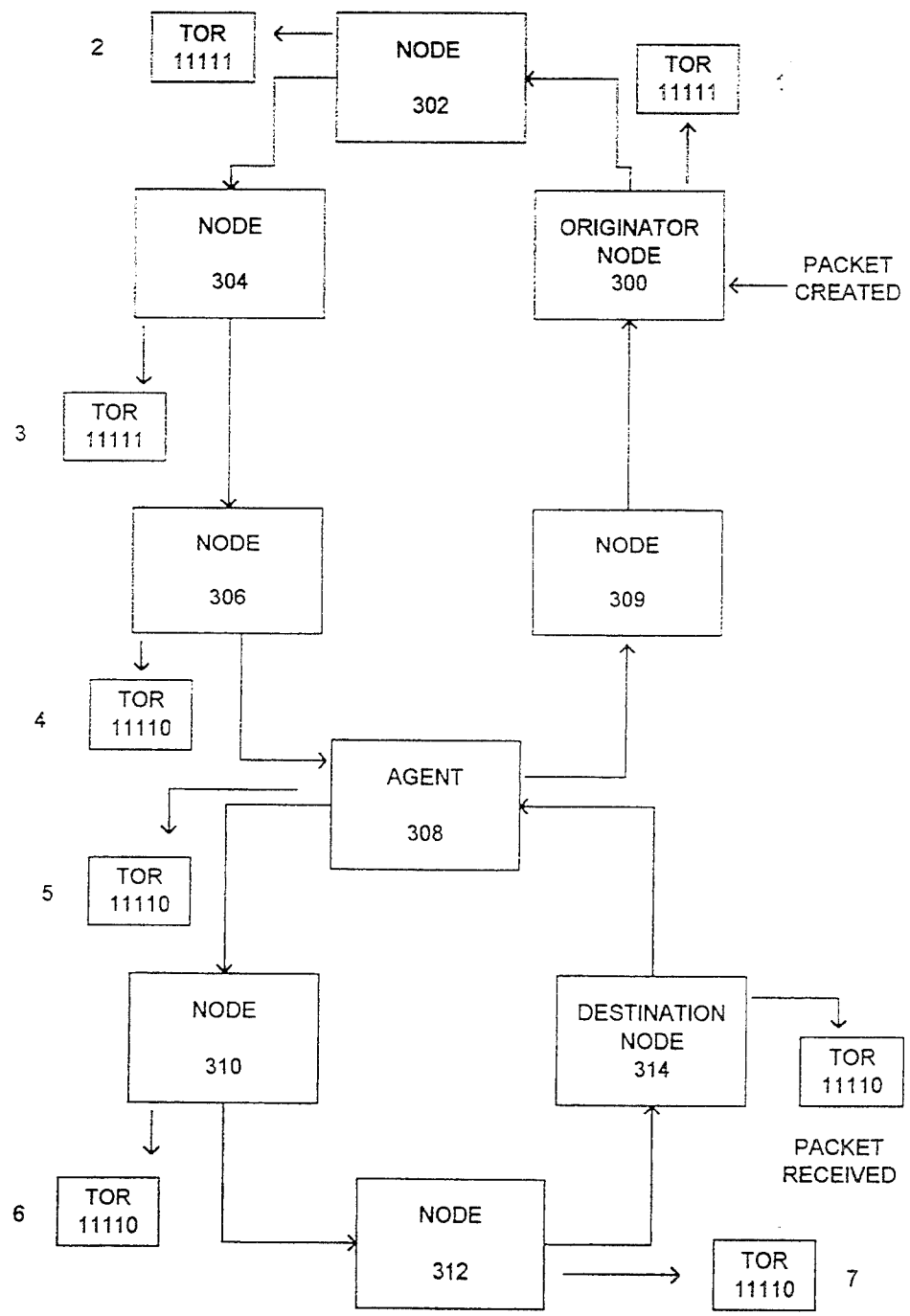
FIG. 3 is a block diagram representation of a communication system including multiple nodes in a pair of unidirectional rings embodying the invention.

FIG. 3 is a block diagram of a communication system with multiple nodes including an originator node 300 and a destination node 314 in a pair of unidirectional rings connected by an agent 308 illustrating sequential operations in accordance with the invention. A packet is created at the originator device 300. Then in step 1, the packet is sent to node 302 with a TOR traversal count value set to all ones, for example, 11111, as shown. In step 2, then the device or node 302 sends the packet to another node 304 with the TOR traversal count value set to all ones or unchanged. In step 3, then the device or node 304 sends the packet to another node 306 with the unchanged TOR traversal count value set to all ones. In step 4, the device or node 306 sends the packet to an agent 308 with the unchanged TOR traversal count value set to all ones. In step 5, the agent 308, having decremented the TOR traversal count value to 11110, sends the packet to another node 310 on a second unidirectional ring. In step 6, node 310 sends the packet to another node 312 with the unchanged TOR traversal count value of 11110. In step 7, node 312 sends the packet to a destination node 314 without changing the TOR traversal count value of 11110. The packet is received at the destination device 314 with the TOR traversal count value of 11110.

Figure 4:
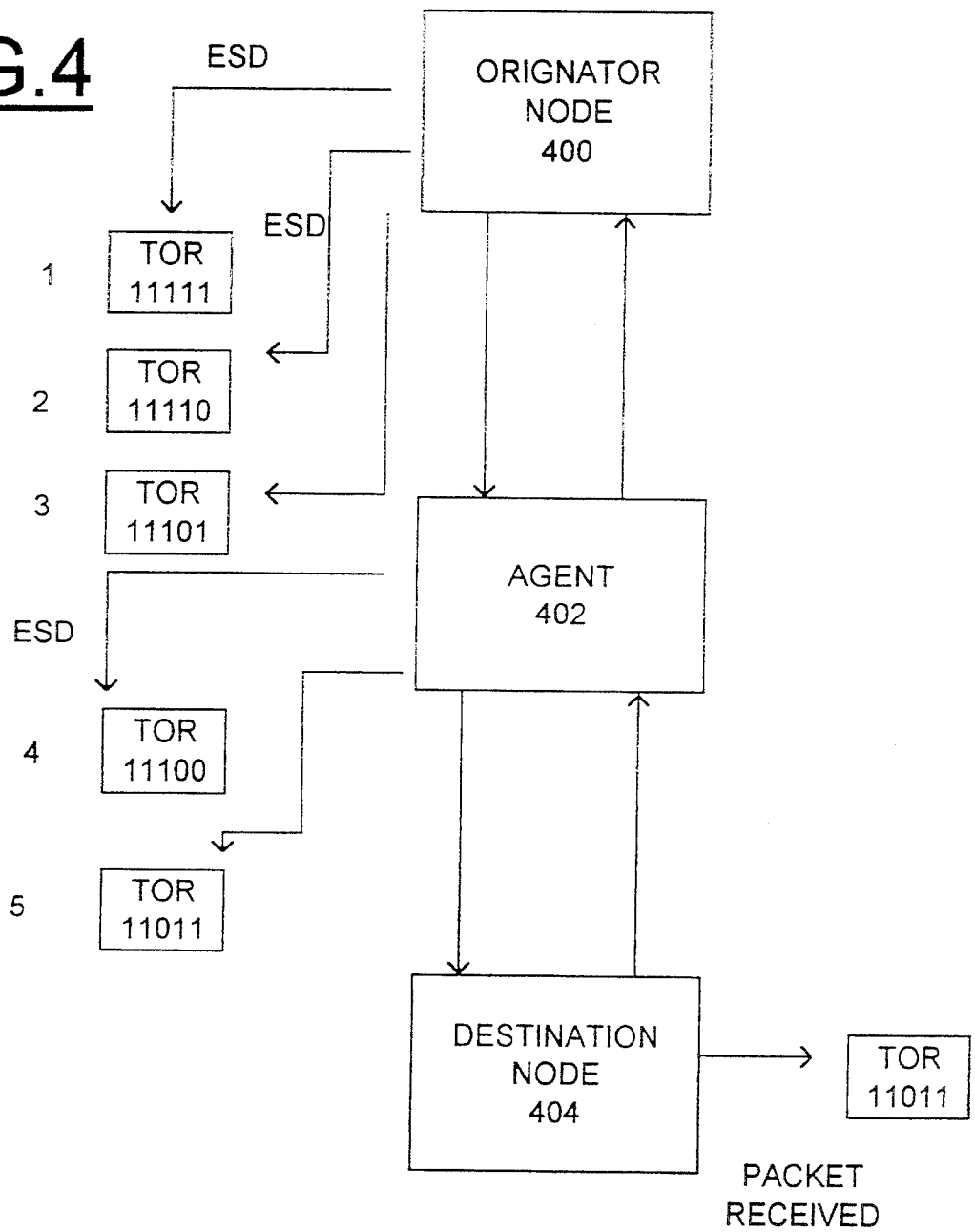
FIG. 4 is a block diagram representation of a communication system including an origination node and a destination node in a pair of unidirectional rings illustrating sequential operations of the invention with electrostatic discharge (ESD) events or other disruptive events.

FIG. 4 is a block diagram of a communication system including an originator node 400 and a destination node 404 in a pair of unidirectional rings connected by an agent 402 illustrating sequential operations in accordance with the invention with electrostatic discharge (ESD) events or other disruptive events causing retries of the packet. A packet is created at the originator device 400. Then in step 1 with an ESD event, the originator device 400 sends the packet with a TOR traversal count value set to 11111. In step 2 with an ESD event, the originator device 400 decrements the TOR traversal count value to 11110 and then sends a retry packet. In step 3, the originator device 400 again decrements the TOR count value by one to 11101 and then sends the packet to agent 402. In step 4, the agent, having decremented the TOR count value to 11100, then sends the packet with an ESD event. In step 5, the agent decrements the TOR count value to 11011 and sends a retry packet to the destination device 404. The packet is received at the destination device 404 with the TOR traversal count value of 11011.

Figure 5:
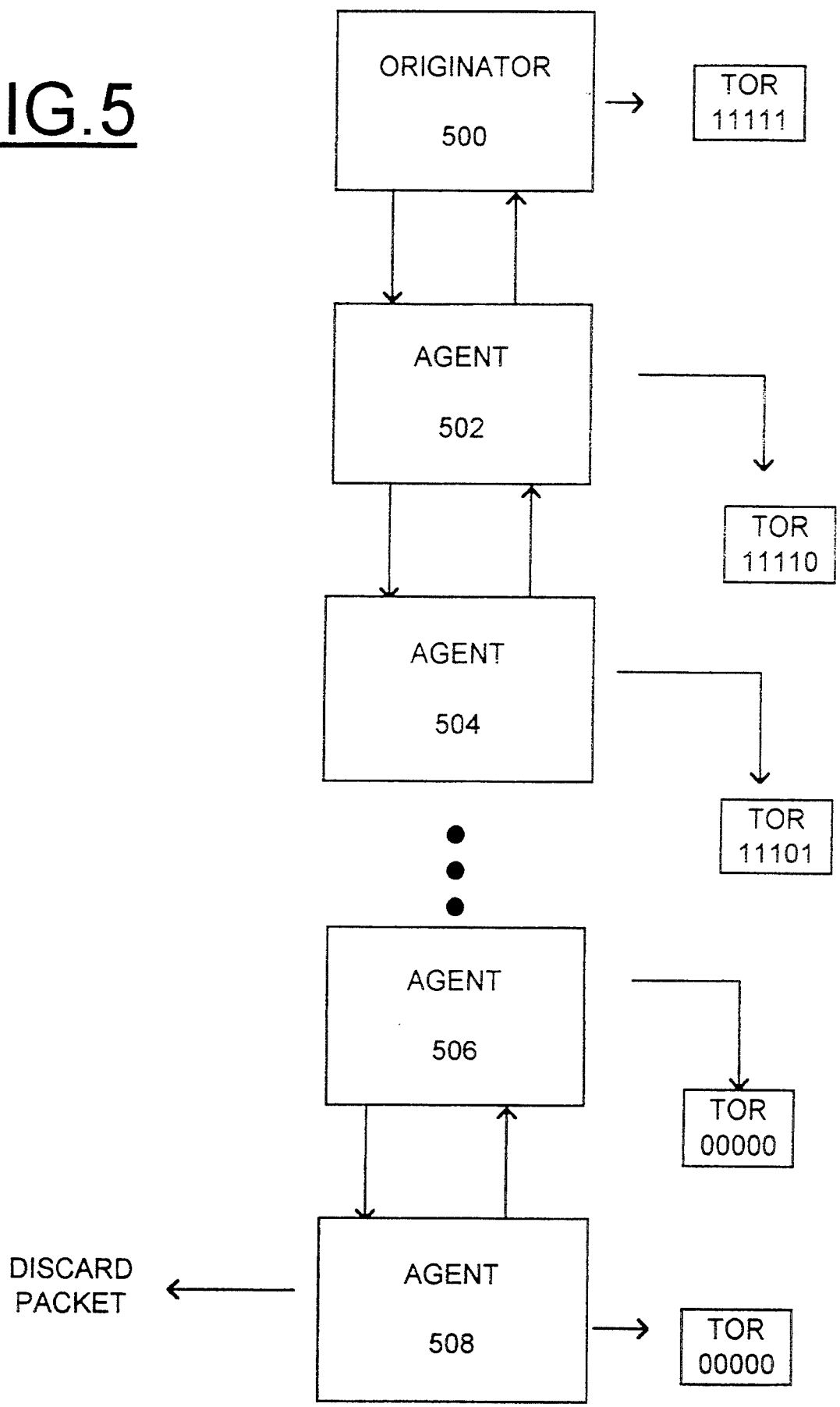
FIG. 5 is a block diagram representation of a communication system including multiple unidirectional rings illustrating sequential operations of the invention with a maximum number of ring traversals.

FIG. 5 is block diagram of a communication system including an originator device 500 and a plurality of agents 502, 504, 506 and 508 connecting multiple unidirectional rings illustrating a maximum number of ring traversals. A packet is created at the originator device 500 with the TOR traversal count value of 11111. After the TOR traversal count value of 11111 of the packet is decremented by a first agent 502 to traversal count value 11110, the packet is passed to a second agent 504. The TOR traversal count value of 11110 is decremented by the second agent 504 to traversal count value 11101 and passed through multiple unidirectional rings. Then agent 506 decrements the TOR traversal count value to 00000 and sends the packet to agent 508. Agent 508 notes the zero TOR traversal count value and discards the packet.

As shown in FIG. 1, for a given connection of devices, a maximal number of ring traversals can be calculated from requestor to responder and back. This number can be loaded in a register of all requestor devices during an initial program load (IPL). When originating a packet from the requestor, this traversal count value is embedded within a field of the outgoing packet as indicated at a block 106. Each time this packet is inserted onto a new ring, the TOR traversal countdown field is decremented at block 110 until either the packet arrives back at the requestor as a response packet or a zero traversal count value is reached.

After an agent decrements the packet's TOR traversal count value to zero, the packet must be discarded by a device receiving the packet, much like the scrubber does with the old bit. Thus errant packets are removed from the interconnect after a time duration based on installed hardware topology, not an absolute time interval.

While the invention has been described with reference to details of the illustrated embodiments, these details are not intended to limit the scope of the invention as defined in the appended claims.

What is claimed and desired to be secured by Letters Patent of the United States is:

1. A method for removal of stale data packets communicated between devices via a plurality of unidirectional rings, said method comprising the steps of:

setting a traversal count value in a packet and sending said packet at a requesting device;

receiving said packet at an agent on one of said unidirectional rings, said agent changing said traversal count value and sending said packet onto another of said unidirectional rings; and receiving said packet at a device, said device identifying said traversal count value and discarding said packet responsive to a predefined traversal count value.

2. A method as recited in claim 1 further includes the steps of:

identifying a retry packet transaction at said requesting device; and changing said traversal count value and sending said packet.

3. A method as recited in claim 1 wherein the step of setting a traversal count value in a packet includes the step of:

setting to one each of a predetermined plurality of predefined bits specified within each packet for said traversal count value.

4. A method as recited in claim 3 wherein said traversal count value is an integer and wherein said step of changing said traversal count value with said agent sending said packet on another of said unidirectional rings includes the step of monotonically approaching said traversal count value by an integer value.

5. A method as recited in claim 3 wherein the step of setting each of a predetermined plurality of bits specified within each packet for said traversal count value to one does not change a cyclic-redundancy code (CRC) for the packet.

6. A method as recited in claim 1 wherein said traversal count value is an integer and wherein said step of changing said traversal count value includes the step of decrementing said traversal count value and wherein said step of discarding said packet is responsive to said predefined traversal count value.

7. A method as recited in claim 1 wherein said traversal count value is an integer and wherein said step of changing said traversal count value includes the step of incrementing said traversal count value and wherein said step of discarding said packet is responsive to said predefined traversal count value.

8. Apparatus for removal of stale data packets communicated between multiple devices via a plurality of unidirectional rings, said apparatus comprising:

said multiple devices including at least one requesting device, each requesting device including means for setting a traversal count value in a packet and for sending said packet;

at least one agent, each said agent including means for receiving a packet on one of said unidirectional rings and means for changing said traversal count value and for sending said packet on another of said unidirectional rings; and each of said multiple devices including means for identifying said traversal count value and means for discarding said packet responsive to a predetermined traversal count value.

9. Apparatus as recited in claim 8 wherein each requesting device further includes means for identifying a retry packet transaction and means responsive to said retry packet transaction identifying means for changing said traversal count value and for sending said retry packet.

10. Apparatus as recited in claim 8 wherein said means for changing said traversal count value include means for monotonically approaching said traversal count value by an integer value.

11. Apparatus as recited in claim 8 wherein each requesting device includes means for setting each of a predetermined plurality of bits specified within each packet for said traversal count value and said means for changing said traversal count value includes integer arithmetic logic circuitry, whereby the need for floating point hardware for stale packet removal is eliminated.

12. A digital packet communication system including a plurality of unidirectional rings comprising:

a plurality of devices, each device connected to one of said plurality of unidirectional rings;

said devices including at least one requesting device, each requesting device including means for setting a traversal count value in a packet and for sending said packet;

each of said devices including means for identifying said traversal count value and means for discarding said packet responsive to a predefined traversal count value; and at least one agent, each said agent including means for receiving a packet on one of said unidirectional rings and means for changing said traversal count value and sending said packet on another of said unidirectional rings.

13. A digital packet communication system as recited in claim 12 wherein each requesting device includes means for sending a retry packet and further includes:

means for changing said traversal count value and for sending said retry packet.

* * * * *